United States Patent [19]

Heath

[11] 4,195,424
[45] Apr. 1, 1980

[54] ASTRO-WHEEL

[76] Inventor: Joyce A. Heath, P.O. Box 1431, Englewood Cliffs, N.J. 07632

[21] Appl. No.: 883,167

[22] Filed: Mar. 3, 1978

[51] Int. Cl.² .............................................. G09B 29/00
[52] U.S. Cl. ...................................................... 35/44
[58] Field of Search ........................ 35/44, 74; 273/161

[56] References Cited

U.S. PATENT DOCUMENTS 3,996,676   12/1976   Bowmen .................. 35/44

Primary Examiner—William H. Grieb

[57] ABSTRACT

The construction being of two 10" diameter circles of plastic approx. 1/32" thick, fastened to the center with a grommet in such a way as to permit the upper disc of clear vinyl to rotate over the lower disc of colored polystyrene. Construction further consist of two sets of ten each high tack vinyl tabs to be placed on and to adhere to the upper disc and can be used over and over.

6 Claims, 12 Drawing Figures

U.S. Patent   Apr. 1, 1980   4,195,424
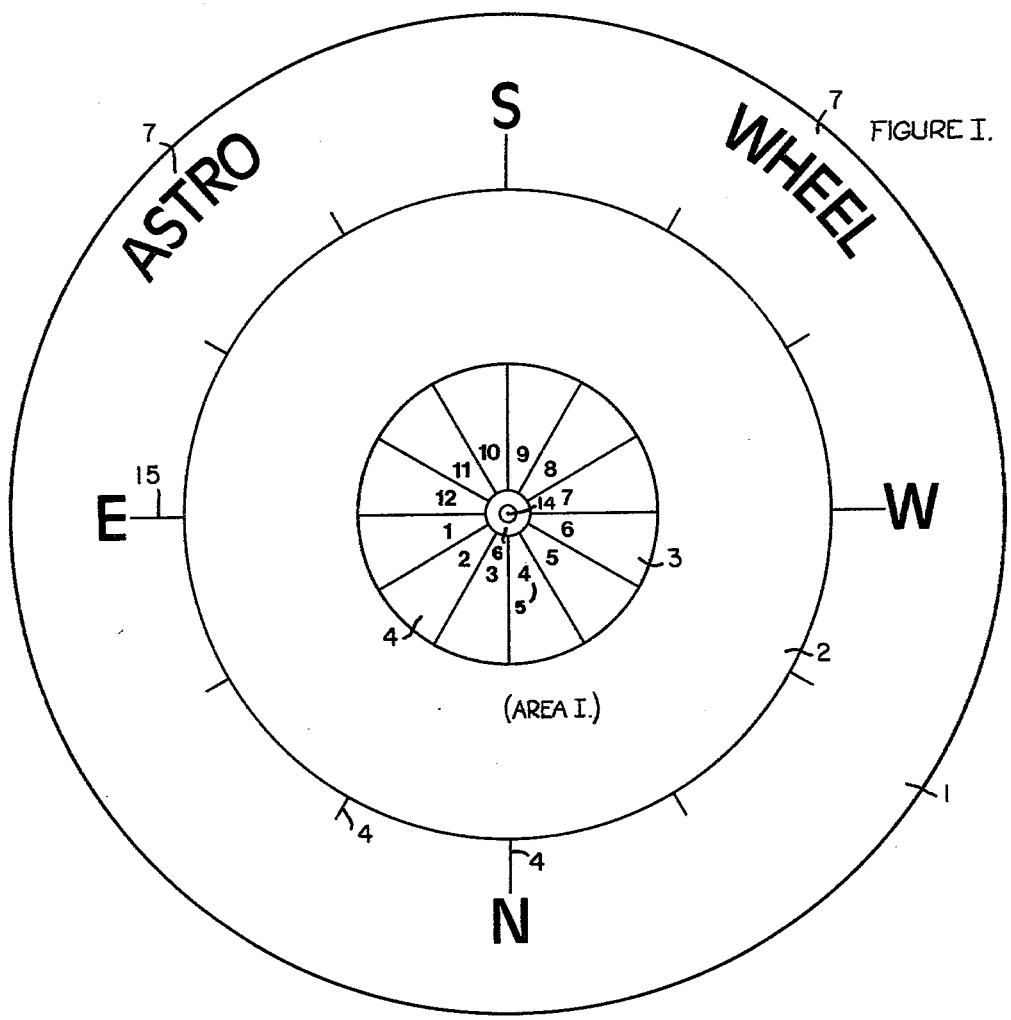
FIGURE I.
(AREA I.)
FIGURES III. to XII.
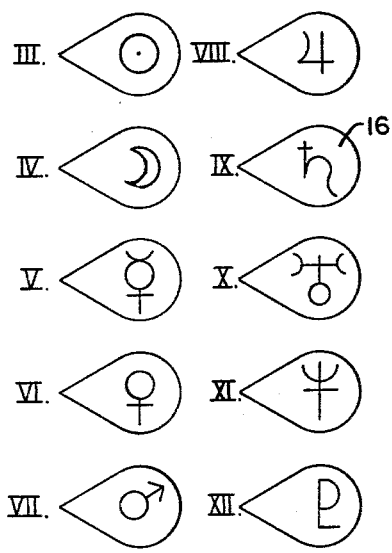
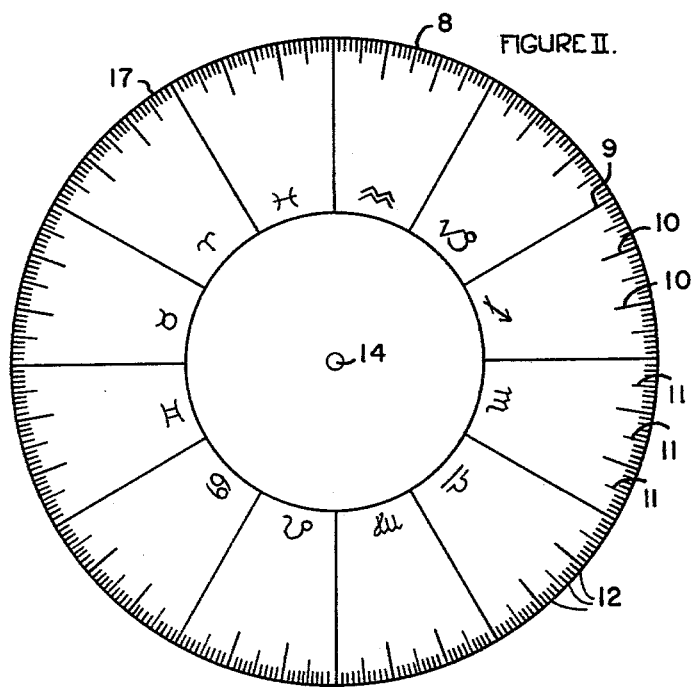
FIGURE II.

ASTRO-WHEEL

BRIEF SUMMARY OF THE INVENTION

The invention is a pre-constructed "equal house" astrology chart which is reusable many times due to the movable parts and can rapidly calculate detailed horoscope relationships.

BRIEF DESCRIPTION OF THE DRAWINGS

FIG. I represents the lower disc of polystyrene and is a complete astrology chart except for the zodiac which will be superimposed over Area I.

FIG. II represents the "printed section" of the upper disc of vinyl and is the zodiac divided into 360 equal degrees.

FIGS. III through XII represents the vinyl tabs which are printed with the symbols of the planets and luminaries.

Scale: FIGS. I and II approx. ⅔ figures III thru XII actual.

DETAILED DESCRIPTION

The "Astro-Wheel" is constructed of: Part 1, (FIG. 1) a 10" diameter disc of white opaque high impact polystyrene 0.030" thick which is printed with a dark blue field, 1, 1¾" deep all around the outer edge. Moving concentrically inward, the next 1¾", 2, (designated as Area I in the drawing) is blank (white); and the following 1¼", 3, is divided into twelve equal parts by black printed lines, 4, which also extend into the dark blue field ¼" from the blank area, ⅛" for the extensions of the horizonal and vertical lines which are marked "E", "W", "S" and "N" on the left, right, top and bottom, respectively. Starting on the left and below the horizonal line, the sections are numbered, 5, in black, one through twelve, counter clock-wise with the background of sections 1, 4, 7 and 10 printed light blue; sections 2, 5, 8 and 11 printed medium blue; and sections 3, 6, 9 and 12 printed dark blue. The ½" diameter circle, 6, in the center is blank. Printed in black ¼" capital lettering ⅛" from and following the curve of the outer edge are the words "ASTRO", 7, and "WHEEL", 7, on the left mid-way between "E" and "S", and on the right mid-way between "S" and "W", respectively.

Part 2 is a 10" diameter disc of clear extruded vinyl 0.010" thick and is printed with black lines and symbols. All lines start at the edge of an imaginary circle, 8, 1¾" from the outer edge and radiate inward for the length designated hereafter; lines, 9, dividing the circle into twelve equal parts, 1¾"; each of these parts are divided into thirty equal parts with the 10th and 20th marks, 10, being ¼"; the 5th, 15th and 25th marks, 11, being ⅛" and all others, 12, being ⅛" long. The twelve equal parts are each marked with a symbol, 13, which represents one of the signs of the zodiac; and is placed 3" from the outer edge, centered within its section and in the order according to the zodiac. Part 2 is placed over Part 1 and the two discs are fastened together with a grommet at points 14 so that the printed area of Part 2 will rotate over that portion of Part 1 designated as Area I in the drawing, thus placing any degree of the zodiac desired at the "E" line, 15, and yet with the ability to move it to any degree as many times as desired.

Parts 3 through 12, inclusively. All of these parts are die cut into a tear-drop shape ¾" long and ¼" wide from 0.012" thick opaque flexible vinyl with a high tack of about 3S or 4S hand. Each of the ten parts will be a different color and will be printed in black with a symbol, 16, representing one of the ten planets or luminaries. Two of each of these parts will be included with each disc chart—twenty in all—one of each to be placed in the outer blue field, 1, with the indicator pointed to the degree of the zodiac i.e., 3' Aries indicated by 17, as ascertained by the chart maker and to be for current or future positions of the planets as in predictive astrology, and one of each to be placed in the zodiac area (Area I) and pointing toward that degree as ascertained by the chart maker as in plotting a birth chart. These parts are pressure sensitive and can be used over and over again.

I claim:

1. A computer for the calculation of detailed horoscopic relationships, the assembly of which forms an "equal house" astrological chart and comprises:

a base disc delineated with concentric circular portions, 1, 2, 3 and 6, one of said circular portion, 1, having twelve equally-spaced radial lines, 4, with at least one of said equally-spaced radial lines, 15, being designated a major axis of the compass and selected from the group consisting of South, North, East and West, one of said circular portion, 3, having twelve equally-spaced radial lines, 4, in inlined relationship to said equally-spaced radial line of said 1st mentioned circular portion and defining areas therebetween, said areas being succeedingly designated in counter clock-wise order with numbers, as indicated by 5, 1 through 12 with the number 12 and 1 being positioned on either side of said radial line corresponding to the radial line, 15, designated as East;

an overlay disc rotatably positionable on said base disc and having a circular portion corresponding substantially to said base disc, said corresponding circular portion of said overlay disc having twelve equally-spaced radial lines, 9, defining therebetween areas designated in the accorded order of the zodiac and including 30 equally-spaced degree marks, 12, 11, and 9, with each 5 and 10 value degree being of greater length than the other said degree marks; and at least one set of symbols, 16, representing planets and luminaries.

2. The astrological computer assembly as defined in claim 1 wherein said base disc is formed of an opaque material.

3. The astrological computer assembly as defined in claim 2 wherein said overlay disc is formed of a transparent plastic material.

4. The astrological computer assembly as defined in claim 3 wherein said base disc and said overlay disc are of like diameter and are fastened together by a grommet through the center of both said base disc and said overlay disc.

5. The astrological computer assembly as defined in claim 4 wherein there is provided two sets of symbols, 16, for positioning with respect to said degree marks, 12, 11, and 9, on said overlay disc and thereby designating the exact degree (or estimate of ½ degree) position of said symbols in a sign, 13; decan; (space between degree marks designated by 9 and 10); or house, 5; one of said sets being positioned within said circular protion and the other set being positioned out of said circular portion thereby the erecting of each set is representative of one person or a chosen data for horoscopic evaluation such as the measurement of planetary aspects within a natal chart and the measurement of aspects formed by comparing two natal charts, or by comparing a natal chart to the position of the planets at a future data.

6. The astrological computer assembly as defined in claim 1 wherein said set of symbols are pressure sensitive.

* * * * *